(12) United States Patent
Chang et al.

(10) Patent No.: US 6,975,846 B2
(45) Date of Patent: Dec. 13, 2005

(54) METHOD AND CIRCUIT TO REDUCE INTERMODULATION DISTORTION

(75) Inventors: Tsung Yuan Chang, Chandler, AZ (US); Waleed Khalil, Tempe, AZ (US); Bobby Nikjou, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 10/155,893

(22) Filed: May 23, 2002

(65) Prior Publication Data

US 2003/0220089 A1 Nov. 27, 2003

(51) Int. Cl.[7] .............................. H04B 1/00; H04B 1/10
(52) U.S. Cl. .................. 455/295; 455/63.1; 455/67.13; 455/307; 375/346; 375/350
(58) Field of Search .............................. 455/63.1, 67.11, 455/67.13, 130, 131, 295, 296, 307, 313, 314, 323, 324, 334, 336; 375/346, 348, 350, 316, 322

(56) References Cited

U.S. PATENT DOCUMENTS

| | | | | |
|---|---|---|---|---|
| 5,557,642 A | * | 9/1996 | Williams | 375/316 |
| 5,918,169 A | * | 6/1999 | Dent | 455/324 |
| 6,005,506 A | * | 12/1999 | Bazarjani et al. | 375/322 |
| 6,307,896 B1 | * | 10/2001 | Gumm et al. | 375/316 |
| 6,470,365 B1 | * | 10/2002 | Rahman et al. | 708/313 |
| 6,590,943 B1 | * | 7/2003 | Ali | 375/332 |

* cited by examiner

Primary Examiner—Quochien B. Vuong
(74) Attorney, Agent, or Firm—Lanny L. Parker

(57) ABSTRACT

Briefly, in accordance with an embodiment of the invention, a method and circuit to reduce intermodulation distortion is provided, wherein the method includes receiving a baseband signal and an interferer signal located in a frequency band and attenuating the interferer signal to reduce intermodulation distortion in the frequency band, wherein the attenuating occurs prior to anti-alias filtering of the baseband signal.

18 Claims, 4 Drawing Sheets

METHOD AND CIRCUIT TO REDUCE INTERMODULATION DISTORTION

BACKGROUND

Intermodulation distortion (IMD) may occur when undesired interference signals (referred to as interferers) present in a frequency band are passed through a nonlinear active element (e.g., an amplifier in a receiver). As an example, a nonlinear active element may generate intermodulation harmonics from interferer signals. The third order intermodulation harmonics may be present within the frequency band that contains the desired signal, thereby distorting the desired signal. This may be referred to as intermodulation distortion. Due to intermodulation distortion, it may be difficult to differentiate the intermodulation distortion signal from the desired signal. Accordingly, the receiver may not be able to detect the desired signal.

Thus, there is a continuing need for alternate ways to reduce intermodulation distortion in communication systems.

BRIEF DESCRIPTION OF THE DRAWINGS

The subject matter regarded as the invention is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
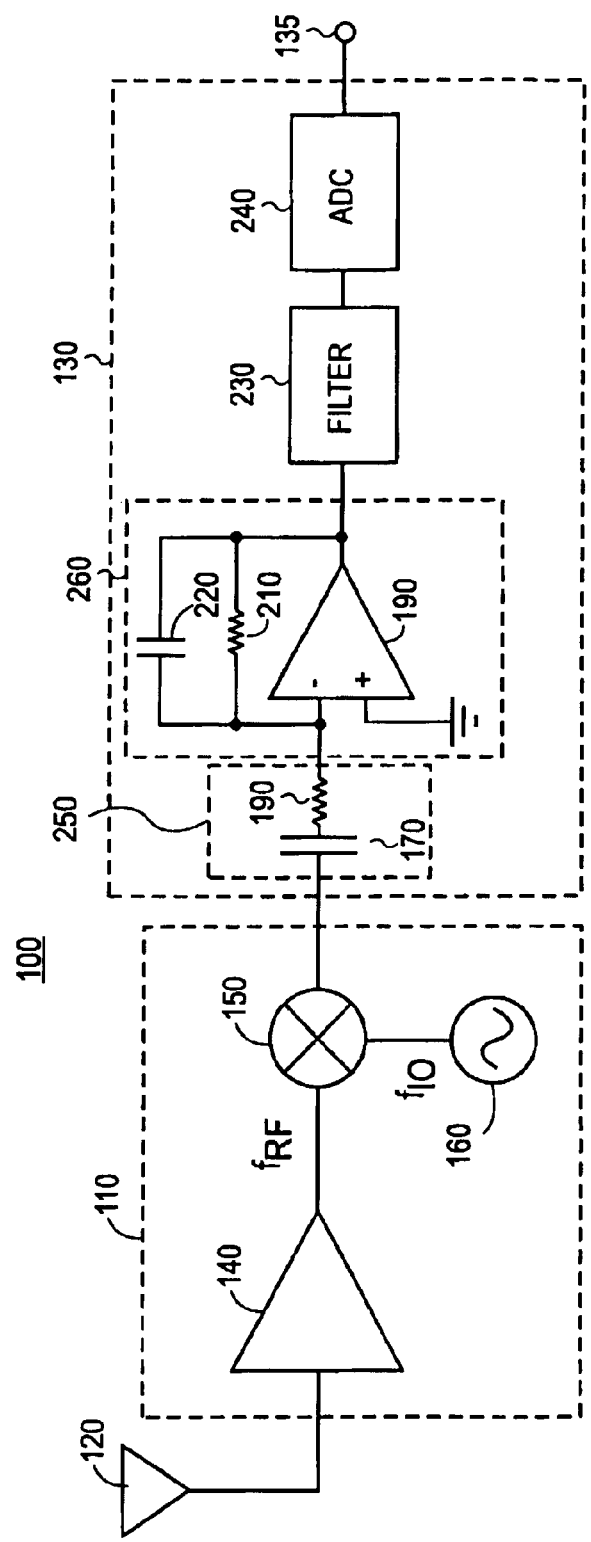
FIG. 1 is a block diagram illustrating a portion of a receiver in accordance with an embodiment of the claimed subject matter.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a receiver 100 is illustrated. Receiver 100 may be used in a variety of wireless radio communication systems such as, for example, cellular systems, two-way pager systems, or television (TV) systems. Alternatively, receiver 100 may be incorporated in a personal digital assistant (PDA), a portable computer, a desktop computer, or a server to provide wireless connectivity. Although it should be pointed out that the scope and application of the claimed subject matter is in no way limited to these examples.

Although the scope of the claimed subject matter is not limited in this respect, receiver 100 may be implemented in a device or system that is adapted to receive messages using use one of the following communication protocols: Code Division Multiple Access (CDMA), cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

In this embodiment, receiver 100 may comprise a portion 110 to receive a radio frequency (RF) signal from an antenna 120. Further, portion 100 may generate a baseband signal from the RF signal. In addition, receiver 100 may comprise a portion 130 to receive the baseband signal from portion 110 and generate a digital signal at an output terminal 135. The digital signal may be transmitted to a processor (not shown) such as, for example, a digital signal processor (DSP) or a microprocessor. In some embodiments, portions 110 and 130 may be discrete integrated circuit components. That is, portion 110 may be implemented as a single "chip" in its own integrated circuit (IC) package and portion 130 may be implemented as a single "chip" in its own IC package.

Portion 110 of receiver 100 may be a direct RF-to-baseband conversion receiver. Portion 110 may also be referred to as a direct conversion or zero intermediate frequency (IF) receiver and may comprise a low noise amplifier (LNA) 140 having an input terminal coupled to antenna 120, a mixer 150 having an RF input terminal coupled to an output terminal of LNA 140, and an oscillator 160 having an output terminal coupled to a local oscillator (LO) input terminal of mixer 150.

During operation, the RF signal received by antenna 120 may be amplified by LNA 140. Mixer 150 may be adapted to multiply or mix the amplified RF signal from LNA 140 with the signal received at its LO input terminal from oscillator 160 to generate a baseband signal. The frequency of the signal received at its RF input terminal is labeled $f_{RF}$ and the frequency of the signal received at its LO input terminal is labeled $f_{LO}$. In this embodiment, the frequency $f_{LO}$ may be approximately equal to the frequency $f_{RF}$ to generate the baseband signal provided at the output terminal of mixer 150, wherein the baseband signal is centered around a frequency of approximately zero hertz.

Although portion 110 of receiver 100 is illustrated as a direct RF-to-baseband conversion receiver, this is not a limitation of the claimed subject matter. For example, portion 110 may have a superheterodyne architecture, wherein the baseband signal is generated from the RF signal in two downconversion operations. That is, portion 110 may include two mixers, wherein the first mixer may downconvert the RF signal to an IF signal and the second mixer may downconvert the IF signal to the baseband signal.

Portion 130 may be referred to as a baseband analog front end (AFE) and may include a capacitor 170, a resistor 180, an amplifier 190, a resistor 210, a capacitor 220, a filter 230, and an analog-to-digital converter (ADC) 240. In this embodiment, capacitor 170 and resistor 180 may serve as a high pass filter 250 to provide direct current (DC) blocking of the baseband signal from portion 100. Filter 250 may have a cutoff frequency ranging from about 1 kilohertz (kHz) to about 20 kHz. Although filter 250 is illustrated as a passive filter including passive components, this is not a limitation of the claimed subject matter. In alternate embodiments, filter 250 may be implemented as an active filter that includes at least one active element such as, for example, an amplifier. In some embodiments, capacitor 170 may be implemented as a discrete, "off-chip" component. For example, if resistor 180, filter 260, filter 230, and ADC 240 are integrated in a single IC package, capacitor 170 may be external to this IC package.

Amplifier 190, resistor 210, and capacitor 220 may serve as an low pass filter 260 having a cutoff frequency ranging from about 2.9 megahertz (MHz) to about 5 MHz. For simplicity, filter 260 is described using single-ended circuitry, although the scope of the claimed subject matter is not limited in this respect. In alternate embodiments, filter 260 may be implemented using differential circuitry. For example, amplifier 190 may be a differential amplifier. In addition, although filter 260 is illustrated as an active filter, this is not a limitation of the claimed subject matter. In alternate embodiments, filter 260 may be a passive filter.

Figure 2:
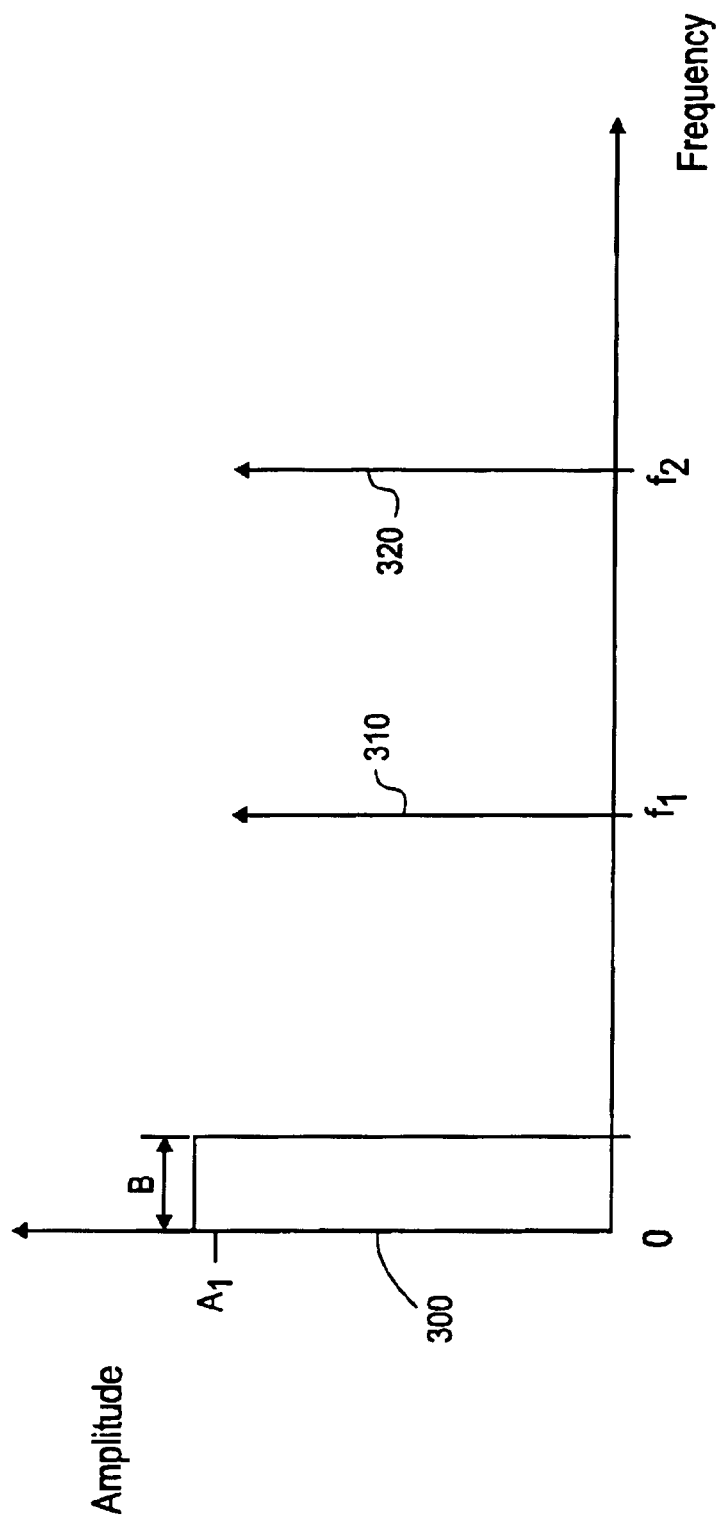
FIG. 2 is a diagram illustrating a frequency band that includes one or more signals including a baseband signal.

FIG. 2 is a diagram illustrating a frequency band that includes one or more signals including the baseband signal. The term frequency band may refer to a range of frequencies in the radio frequency (RF) spectrum and a band may include a defined upper and lower frequency limit. Bandwidth may refer to a range of frequencies between defined upper and lower frequency limits. In addition, a channel may refer to a defined range of frequencies having a bandwidth.

In the example shown in FIG. 2, a channel 300 having a bandwidth labeled B is illustrated. In this example, the baseband signal is located in channel 300. In addition, interferer signals 310 and 320 are illustrated in FIG. 2. The frequencies of interferer signals 310 and 320 are labeled $f_1$ and $f_2$, respectively.

Figure 3:
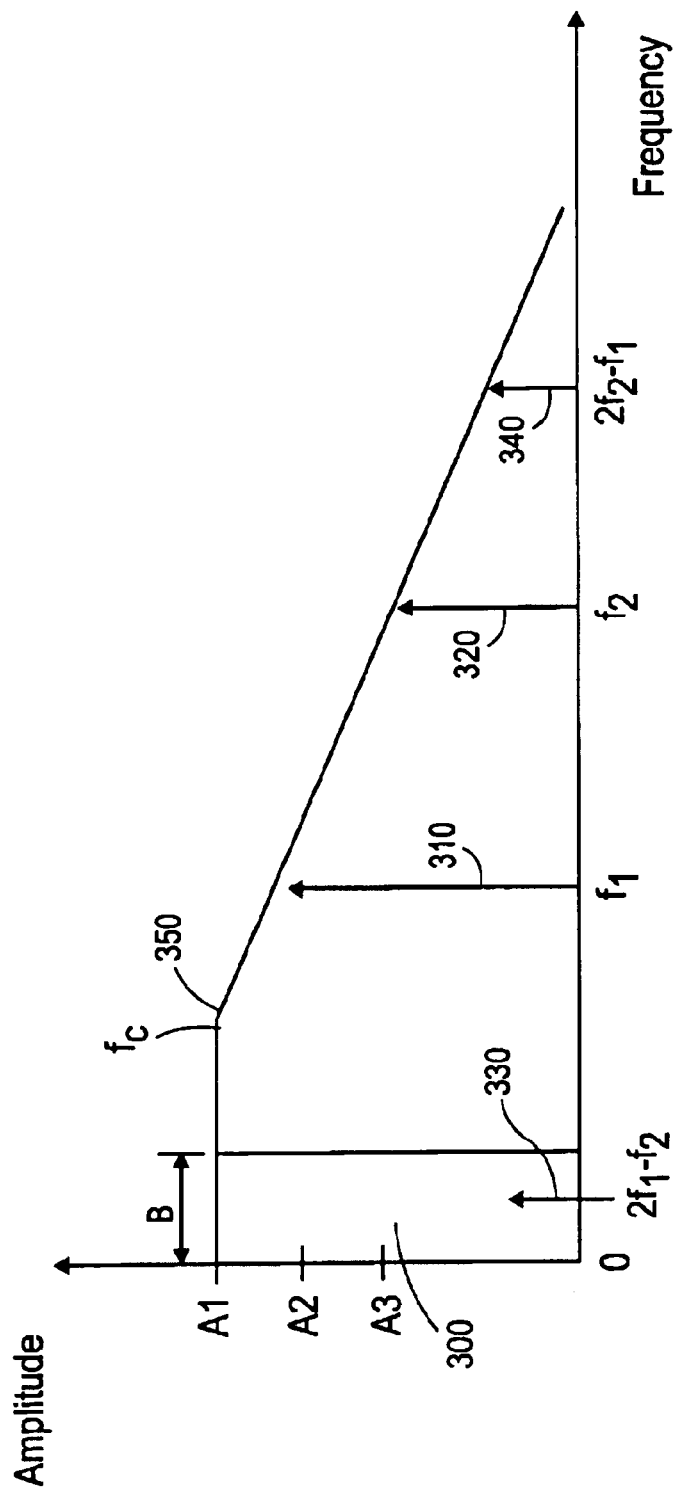
FIG. 3 is a diagram illustrating intermodulation distortion characteristics of signals passed through the receiver illustrated in FIG. 1.

In this embodiment, filter 260 (FIG. 1) is coupled to receive the baseband signal located in channel 300 from high pass filter 250. In addition, filter 260 receives interferer signals 310 and 320, and depending on the linearity of filter 260, may generate intermodulation harmonics that may distort the desired baseband signal. FIG. 3 may be used to illustrate the intermodulation distortion characteristics. FIG. 3 is a diagram illustrating the frequency band illustrated in FIG. 2 after the signals illustrated in FIG. 2 pass through filter 260. FIG. 3 may also be used to illustrate the attenuating characteristics of filter 260 and the effect of attenuating interferer signals 310 and 320.

Upon receiving interferer signals 310 and 320, filter 260 may generate third-order intermodulation harmonic signals 330 and 340. The frequency of signal 330 is $2f_1-f_2$ and the frequency of signal 340 is $2f_2-f_1$. Signals 330 and 340 may be referred to as interference signals or intermodulation distortion signals. Since signal 330 is present in channel 330, signal 330 may combine or mix with the baseband signal, thereby distorting the baseband signal.

In order to reduce intermodulation distortion, filter 260 may be adapted to attenuate the amplitude of interferer signals 310 and 320, thereby attenuating any resulting intermodulation harmonic signals. The frequency response of filter 260 is illustrated by line 350. The cutoff frequency of filter 260 is labeled $f_c$. The cutoff frequency of filter 260 may be chosen so as to not affect the desired baseband signal and to attenuate relatively higher frequency interferer signals. As is illustrated in FIG. 3, the amplitudes of interferer signals 310 and 320 may be reduced from an amplitude of $A_1$ to amplitudes of $A_2$ and $A_3$, respectively. By attenuating interferer signals 310 and 320, the amplitude of signal 330 may be reduced, which may result in a reduction of intermodulation distortion within receiver 100.

Filter 230 may be coupled to receive the baseband signal from filter 260. Filter 230 may include circuitry to provide anti-alias filtering of the baseband signal. Aliasing may occur when interferer signals are combined with the sampling signal from a clock of ADC 240 to generate products that may appear in channel 300 and may mix with the baseband signal.

In alternate embodiments, filter 230 may include circuitry to provide channel select filtering of the baseband signal, wherein filter 230 attenuates channels adjacent to channel 300. In this example, filter 230 may include a programmable gain amplifier (PGA) to provide gain to the baseband signal to increase the amplitude of the baseband signal to the dynamic range level of ADC 240. Compared to an anti-alias filter, the slope of the attenuation of a channel select filter after the cutoff frequency may be relatively steeper than the slope of the attenuation of an anti-alias filter. Filter 230 may be a low pass filter and may be implemented using switched-capacitor circuit techniques.

ADC 240 is coupled to receive the baseband signal from filter 230 and converts the analog baseband signal received from filter 230 to a digital baseband signal. This digital baseband signal is transmitted from the output terminal of ADC 240 to output terminal 135.

Although filter 230 is illustrated as being coupled between filter 260 and ADC 240, the scope of the claimed subject matter is not a limited in this respect. For example, in alternate embodiments, filter 230 may be implemented as a digital filter to provide alias filtering and/or channel select filtering. For example, in embodiments where receiver 100 is a GSM receiver, ADC 240 may be coupled between filters 260 and 230. That is, the input terminal of ADC 240 may be directly connected to the output terminal of filter 260 and the input terminal of filter 230 may be directly connected to the output terminal of ADC 240.

In the embodiment described with reference to FIGS. 2–3, after portion 100 generates a baseband signal from a received RF signal, filter 260 receives the baseband signal and interferer signals located in a frequency band. Filter 260 may comprise circuitry adapted to attenuate at least one of the interferer signals to reduce the level of intermodulation distortion in the frequency band, wherein the attenuating may occur prior to anti-alias filtering and/or prior to channel-select filtering of the baseband signal. In addition, in the embodiment described with reference to FIGS. 2 and 3, filter 260 attenuates at least one interferer signal to reduce intermodulation distortion in the frequency band prior to the analog-to-digital conversion of the baseband signal.

Figure 4:
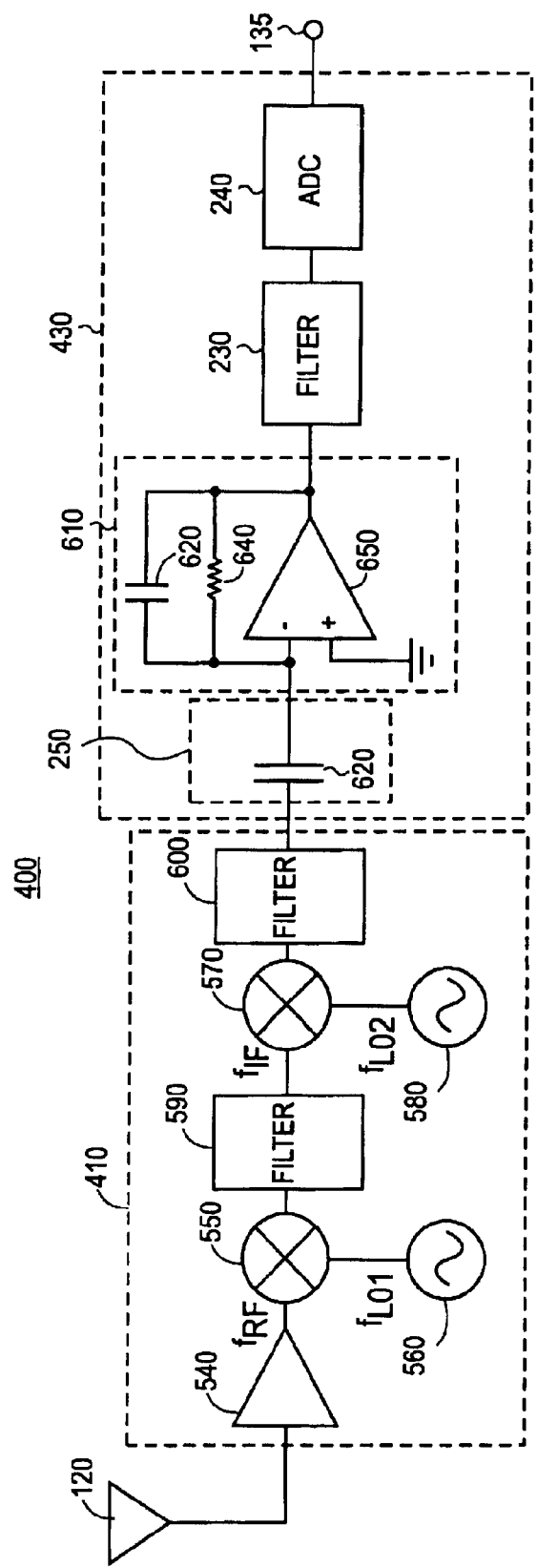
FIG. 4 is a block diagram illustrating a portion of a receiver in accordance with an embodiment of the claimed subject matter.

Turning to FIG. 4, an embodiment of a receiver 400 is illustrated. Receiver 400 may include a portion 410 adapted to generate a baseband signal from a RF signal received at antenna 120, and a portion 430 adapted to generate a digital signal from the baseband signal.

In this embodiment, portion 410 is implemented as a superheterodyne receiver comprising a low noise amplifier (LNA) 540, mixers 550 and 570, and oscillators 560 and 580. Mixer 550 may downconvert the received RF signal to an IF signal. The frequency of the RF signal is labeled $f_{RF}$, the frequency of the IF signal is labeled $f_{IF}$, and the frequency of the signal generated by oscillator 560 is labeled $F_{LO1}$. Mixer 550 mixes the RF signal with the signal from oscillator 560 to generate two signals having intermediate frequencies of $f_{RF}-f_{LO1}$ and $f_{RF}+f_{LO1}$. Filter 590 may be a low pass filter to pass the signal having the intermediate frequency of $f_{RF}-f_{LO1}$ (labeled $f_{IF}$). Mixer 570 mixes the IF signal from filter 590 with the signal from oscillator 580 to generate two signals having frequencies of $f_{IF}-f_{LO2}$ and $f_{IF}+f_{LO2}$. Filter 600 may be a low pass filter to pass the signal having the baseband frequency of $f_{IF}-f_{LO2}$. In one example, $f_{RF}$ is about 935 MHz, $f_{LO1}$ is about 1006 MHz and $f_{IF}$ is about 71 MHz. In this example, $f_{LO2}$ is about 71 MHz.

In the embodiment illustrated in FIG. 4, portion 430 comprises a circuit 610, filter 230, and ADC 240. Circuit 610 comprises capacitors 620 and 630, a resistor 640, and an amplifier 650 and may provide DC blocking of the baseband signal from portion 410 by providing a high pass frequency response using capacitor 620. In addition, circuit 610 may provide attenuation of relatively high frequency interferer signals to reduce intermodulation distortion in receiver 400 by providing a low pass frequency response using resistor 640, capacitor 630, and amplifier 650. In other words, circuit 610 may serve as a bandpass filter that provides DC blocking of the baseband signal and attenuating of interferer signals to reduce intermodulation distortion in the channel that includes the baseband signal.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method, comprising:
   receiving a baseband signal and an interferer signal located in a frequency band after generating the baseband signal from a radio frequency (RF) signal;
   providing a serially connected capacitor-resistor passive filter to receive the baseband signal and the interferer signal; and
   attenuating the interferer signal received from the capacitor-resistor passive filter to reduce intermodulation distortion in the frequency band, wherein the attenuating occurs prior to anti-alias filtering of the baseband signal.

2. The method of claim 1, wherein the capacitor-resistor passive filter provides direct current blocking of the baseband signal.

3. The method of claim 1, further comprising transmitting the baseband signal through a high pass filter prior to the attenuating.

4. The method of claim 1, wherein the baseband signal is an analog signal, and further comprising converting the baseband signal to a digital signal after the attenuating of the interferer signal.

5. The method of claim 4, wherein the digital signal is generated prior to the anti-alias filtering.

6. The method of claim 4, wherein the digital signal is generated after the anti-alias filtering.

7. The method of claim 1, wherein the baseband signal is generated by down converting the RF signal to an Intermediate Frequency signal followed by down converting the IF signal to the baseband signal.

8. An apparatus, comprising:
   a first circuit having an input terminal coupled to receive a baseband signal located in a frequency band, wherein the first circuit is adapted to reduce intermodulation distortion in the frequency band by attenuating an interference signal located in the frequency band, wherein the intermodulation distortion is attenuated by an amplifier having a parallel connected resistor and capacitor coupled across terminals of the amplifier;
   a second circuit having an input terminal coupled to an output terminal of the first circuit, wherein the second circuit is adapted to provide anti-alias filtering of the baseband signal; and a capacitor-resistor passive filter coupled to an input of the amplifier to provide direct current blocking of the baseband signal.

9. The apparatus of claim 8, wherein the second circuit is a low pass filter.

10. The apparatus of claim 8, wherein the first circuit is a low pass filter.

11. The apparatus of claim 8, wherein the first circuit is an active filter.

12. The apparatus of claim 8, further comprising a third circuit adapted to generate the baseband signal from a radio frequency (RF) signal.

13. The apparatus of claim 12, wherein the third circuit comprises:
   a low noise amplifier (LNA) having an input terminal to receive the RF signal;
   a mixer having a first input terminal coupled to an output terminal of the LNA and an output terminal coupled to an input terminal of the first circuit; and
   an oscillator having an output terminal coupled to a second input terminal of the mixer.

14. The apparatus of claim 13, further comprising a high pass filter having a first input terminal coupled to an output terminal of the third circuit and an output terminal coupled to the input terminal of the first circuit.

15. A receiver to receive a radio frequency (RF signal, comprising:
   a direct RF-to-baseband conversion portion to receive the RF signal and generate a baseband signal from the RF signal;
   a capacitor-resistor passive filter coupled to an input of an amplifier to provide direct current blocking of the baseband signal;
   a second filter adapted to reduce intermodulation distortion in a frequency band by attenuating an interferer signal located in the frequency band, wherein the second filter includes the amplifier having a parallel connected resistor and capacitor coupled across terminal of the amplifier; and
   a third filter having an input terminal coupled to an output terminal of the second filter, wherein the third filter is adapted to provide anti-alias filtering of the baseband signal.

16. The receiver of claim 15, wherein the receiver is a code division multiple access (CDM4A) receiver.

17. The receiver of claim 15, wherein the second and third filters are low pass filters.

18. The receiver of claim 15, further comprising analog-to-digital converter (ADC) coupled to an output terminal of the third filter.

* * * * *